May 12, 1931. W. C. JOHNSTON 1,804,833
ORNAMENTAL ARTICLE AND METHOD OF MAKING THE SAME
Filed Aug. 22, 1929

Inventor:
Walter C. Johnston,
by Arthur F. Randall
Atty.

Patented May 12, 1931

1,804,833

UNITED STATES PATENT OFFICE

WALTER C. JOHNSTON, OF POLK CITY, FLORIDA

ORNAMENTAL ARTICLE AND METHOD OF MAKING THE SAME

Application filed August 22, 1929. Serial No. 387,743.

My invention relates to improvements in natural animal teeth whereby the same are adapted to be used for useful and ornamental purposes and as articles of adornment or parts thereof such as the pendants of neck chains, bracelets, ear-drops or the like, or as parts of scarf-pins, brooches or other articles to which it is desired to fasten the teeth in a manner to display the same to the best advantage.

The object of my invention is to provide an efficient, strong and reliable joint or connection between a natural tooth of an animal and the shank of another element such, for example, as a rag bolt.

To this end my invention consists in first drilling or otherwise forming an undersized hole or socket in a tooth of the kind referred to; then soaking the tooth in lacquer or the like to soften and swell the dentine; then forcing into the hole or socket the irregularly shaped shank of a rag bolt, or other element, to which the tooth is to be connected, and thereafter permitting the lacquer or the like to harden by exposure to the atmosphere or otherwise.

The lacquer employed may be the waste product accompanying the manufacture of celluloid to which may be added a liquid solution of celluloid dissolved in acetone. Thus when dried the lacquer is comparatively hard and solid and not only fills up the pores of the dentine but provides a waterproof transparent covering or sheath for the exterior of the tooth, while at the same time the lacquer that has soaked into the dentine serves to cement the shank within the hole and also to strengthen and reinforce the dentine against breakage or distortion under the stresses to which the finished article is subjected during use.

My invention also provides, as a new article of manufacture, a pendant comprising a natural tooth whose root portion is formed with a hole or socket that is occupied by the irregularly shaped shank of a rag eye-bolt or other device, the dentine of the tooth being molded and fixed to the shape of said shank so that the two are positively interlocked and held against separation under endwise strain imposed on said shank in a direction tending to withdraw the same from the hole or socket.

Other features of my invention are hereinafter pointed out.

In the accompanying drawings:—

Figure 1:
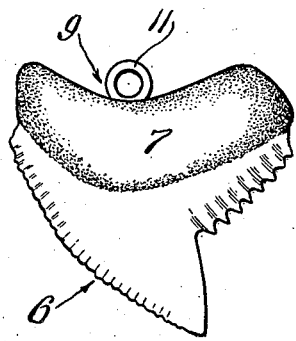
Figure 1 is an elevation enlarged about three times natural size of a shark's tooth pendant constructed in accordance with my invention.

The pendant herein illustrated comprises a natural or real shark's tooth 6 into the base or root portion 7 of which is drilled a hole 8 to receive the irregular shank 10 of a rag bolt 9. This rag bolt is made at its outer end with an eye 11 by means of which it is attached to another part of the device in which the pendant is incorporated, such as a neck band, bracelet or the like.

Figure 2:
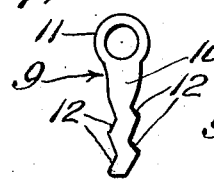
Figure 2 is a side elevation of the preferred form of eye-bolt.
Figure 3:
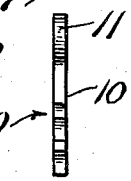
Figure 3 is an edge view of the eye-bolt shown in Fig. 2.
Figure 4:
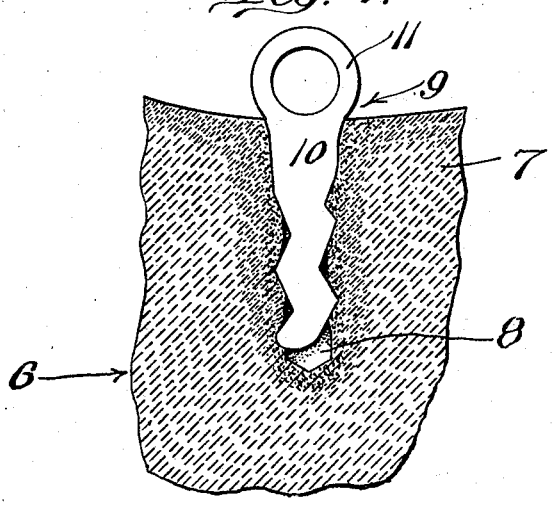
Figure 4 is a sectional view, on larger scale, of a portion of the pendant shown in Fig. 1.

The rag bolt 9 is preferably a sheet metal stamping and the opposite side edges of its shank 10 are made serrated or undulating as shown in Figs. 2 and 4 so as to provide a plurality of shoulders 12 facing the outer end of the bolt.

The hole 8 that is drilled into the base or root 7 of the tooth is made under-size, that is, it is made somewhat less in diameter than the over-all width of the shank 10 as viewed in Fig. 2 so that when said shank is forced into hole 8 the dentine surrounding the latter must yield.

To attempt to force the shank 10 into the under-sized hole 8 while the tooth 6 is in its natural dry or normal condition would in most cases result in splitting the tooth, but even if successfully wedged into the hole the connection would be insecure and unreliable owing to the natural weakness and cellular construction of the dentine.

Therefore, after drilling the hole 8 the tooth is submerged and soaked in a liquid waterproof adhesive, preferably lacquer to which has been added a solution of celluloid and acetone, until the porous dentine 7 both upon the outside of the tooth and surrounding the hole 8 is impregnated or saturated with said lacquer. Upon removal of the tooth from this lacquer the dentine adjacent the unenameled surfaces thereof is comparatively soft and spongy so that the shank 10 is easily forced into the hole 8 without splitting the tooth, the springy dentine surrounding said hole fitting itself to the shape of the two oppositely disposed serrated edges thereof.

A pair of specially constructed pliers is employed to handle the eye-bolt 9 while the latter is being inserted within the hole 8.

The tooth with the eye-bolt 9 therein is then exposed to the atmosphere for about forty-eight hours or until the lacquer has hardened and then the tooth is in its finished condition ready to be incorporated in the device of which it is to form part.

Lacquer such as referred to above is used for the reason that while in its liquid state it softens the dentine of the tooth and upon hardening it not only reinforces and strengthens the dentine that is engaged by shank 10, but it also serves to cement the said shank to the tooth.

This lacquer is also advantageous for the reason that it fills up the pores upon the exterior of the bone-like dentine root 7 and envelops the tooth in a transparent waterproof sheath which prevents discoloration of the tooth, particularly the base portion 7, through contact with the skin of the wearer.

Figure 5:
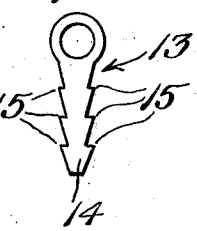
Figure 5 illustrates another form of eye-bolt.

Figure 5 shows another form of rag bolt 13 having the opposite side edges of its shank 14 made with teeth 15.

While I have herein illustrated and described my invention as practiced in connection with the production of a shark's tooth pendant, I do not desire to limit my invention in this respect as the same may be employed as well as fastening various kinds of natural teeth to the serrated or irregular shank of other devices than eye-bolts such as herein shown.

What I claim is:

1. The above described method of fastening a natural tooth to another element having an irregularly shaped shank which consists in first forming an undersized socket in the dentine of the root portion of said tooth to receive said shank; then softening the dentine of the tooth to render the same yielding; then forcing said shank endwise into said socket while the dentine is soft so that the latter fits itself to the irregular shape of said shank, and lastly, restoring said dentine to its original hard condition to secure said shank within the socket.

2. The above described method of fastening a natural tooth to another element having an irregularly shaped shank which consists in first forming an undersized socket in the dentine of the root portion of said tooth to receive said shank; then softening the dentine of the tooth by soaking the latter in liquid lacquer; then forcing said shank endwise into said socket while the dentine is soft so that the latter fits itself to the irregular shape of said shank, and lastly, restoring said dentine to its original hard condition by drying the same.

3. The above described method of fastening a natural tooth to a rag eye-bolt which consists in first forming an undersized socket in the dentine of the root portion of said tooth to receive the shank of said eye-bolt; then softening the dentine of the tooth by soaking the latter in liquid lacquer; then forcing said shank endwise into said socket while the dentine is soft so that the latter fits itself to said shank, and lastly drying said dentine to restore the same to its original hard condition.

4. The combination of a natural tooth having the dentine of its root portion formed with an under-sized drilled hole, and a rag eye-bolt having its irregular shank fitted into said hole with the dentine that surrounds said shank molded to fit the same thereby to lock said shank within said socket.

Signed by me at Polk City, Polk County, Florida, this 12 day of August, 1929.

WALTER C. JOHNSTON.